(12) United States Patent
Parente et al.

(10) Patent No.: US 12,649,664 B2
(45) Date of Patent: Jun. 9, 2026

(54) PROCESS FOR SYNTHESIS OF CARBON BEADS

(71) Applicant: Millennial Materials and Devices Inc., Stony Brook, NY (US)

(72) Inventors: Michael Parente, Stony Brook, NY (US); Balaji Sitharaman, Stony Brook, NY (US)

(73) Assignee: Millennial Materials and Devices Inc.

( * ) Notice: Subject to any disclaimer, the term of this patent is extended or adjusted under 35 U.S.C. 154(b) by 708 days.

(21) Appl. No.: 17/760,477

(22) PCT Filed: Mar. 2, 2021

(86) PCT No.: PCT/US2021/020366
§ 371 (c)(1),
(2) Date: Aug. 10, 2022

(87) PCT Pub. No.: WO2021/178338
PCT Pub. Date: Sep. 10, 2021

(65) Prior Publication Data
US 2023/0108396 A1 Apr. 6, 2023

Related U.S. Application Data

(60) Provisional application No. 62/983,863, filed on Mar. 2, 2020.

(51) Int. Cl.
*B01J 2/06* (2006.01)
*B01D 39/20* (2006.01)
(Continued)

(52) U.S. Cl.
CPC .................. *C01B 32/21* (2017.08); *B01J 2/06* (2013.01); *C09C 1/58* (2013.01); *B01D 39/2062* (2013.01);
(Continued)

(58) Field of Classification Search
CPC ...................................... B01J 2/06; B01J 2/08
See application file for complete search history.

(56) References Cited

U.S. PATENT DOCUMENTS

| | | | |
|---|---|---|---|
| 4,273,675 A | 6/1981 | Shiiki et al. | |
| 10,757,988 B1 * | 9/2020 | Swogger ............... | A61M 16/06 |

(Continued)

FOREIGN PATENT DOCUMENTS

| | | | |
|---|---|---|---|
| CN | 102515144 B | 4/2014 | |
| CN | 109231196 A * | 1/2019 | ........... C01B 32/198 |

(Continued)

OTHER PUBLICATIONS

Novel microreactors for functional polymer beads, Takasi Nisisako, Toru Torii, Toshiro Higuchi (Year: 2004).*

(Continued)

*Primary Examiner* — Joseph S Del Sole
(74) *Attorney, Agent, or Firm* — Jason C. Cameron

(57) ABSTRACT

The present invention provides for a process for synthesis of carbon beads comprising sub-micron size, micron size or milli size. The process enables modulation of the viscous slurry for synthesis of the carbon beads with improved physico-chemical properties. The process enhances ability of the carbon beads to withstand extreme pH and high temperatures. The present invention also provides a composition for synthesis of the carbon beads. The present invention also provides a microfluidic droplet generator for synthesizing the carbon beads. The carbon beads synthesized by the present invention are applicable in separation, filtration, purification, wires and cables, electrodes, sensor, composite and additive manufacturing, pharmaceutical delivery applications.

18 Claims, 11 Drawing Sheets

(51) Int. Cl.
    *C01B 32/21*         (2017.01)
    *C09C 1/58*         (2006.01)

(52) U.S. Cl.
    CPC ...... *B01D 2239/10* (2013.01); *C01P 2004/02* (2013.01); *C01P 2004/03* (2013.01); *C01P 2004/32* (2013.01)

(56)         References Cited

U.S. PATENT DOCUMENTS

| | | | | |
|---|---|---|---|---|
| 2006/0165989 | A1* | 7/2006 | Takikawa | G03G 9/097 428/402.2 |
| 2009/0281272 | A1* | 11/2009 | Yilmaz | B01J 20/28019 528/332 |
| 2014/0087058 | A1* | 3/2014 | Meth | B01J 2/003 977/890 |
| 2017/0120219 | A1 | 5/2017 | Diamond et al. | |
| 2018/0133685 | A1* | 5/2018 | Lu | C07K 1/16 |
| 2019/0328629 | A1* | 10/2019 | Kitagawa | B01J 13/0065 |
| 2020/0253875 | A1* | 8/2020 | Coffman | A61K 9/5031 |
| 2021/0138421 | A1* | 5/2021 | Leduc | A61K 9/5089 |

FOREIGN PATENT DOCUMENTS

| | | | | | |
|---|---|---|---|---|---|
| EP | 3315516 | A1 | | 5/2018 | |
| KR | 20140028449 | A | | 3/2014 | |
| WO | WO-2013120011 | A1 | * | 8/2013 | ............ H01G 11/44 |
| WO | WO-2020087075 | A1 | * | 4/2020 | ............ D21H 13/50 |
| WO | WO-2025225355 | A1 | * | 10/2025 | ............ C25B 13/02 |

OTHER PUBLICATIONS

Ciba Darocur 1173 NPL (Year: 2001).*
CAS RN | 77-77-0 | Divinyl Sulfone (Year: 2025).*
Takasi Nisisako et al. "Novel microreactors for functional polymer beads" (Year: 2004).*
A novel form of carbon micro-balls from coal; ScienceDirect; vol. 41, Issue 4, 2003, pp. 767-772; https://www.sciencedirect.com/science/article/abs/pil/S0008622302003925.
Preparation of microporous carbon nanospheres; Dec. 2003Carbon 41(8):1652-1654 DOI:10.1016/S0008-6223(03)00081-2; Sang-Ick Lee et. al.; https://www.researchgate.net/publication/244318025_Preparation_of_microporous_carbon_nanospheres.

* cited by examiner

PROCESS FOR SYNTHESIS OF CARBON BEADS

EARLIEST PRIORITY DATE

This application claims priority from a Provisional patent application filed in US having Patent Application No. 62/983,863, filed on Mar. 2, 2020, and titled "A PROCESS FOR SYNTHESIZING CARBON BEADS AND PRODUCT THEREOF" and claims priority from a PCT patent application filed in US having Patent Application No. PCT/US21/20366, filed on Mar. 2, 2021, and titled "A PROCESS FOR SYNTHESIS OF CARBON BEADS".

FIELD OF INVENTION

Embodiments of the present invention relates to sub-micron, micro- and mill-scopic structures and more particularly it relates to a process for synthesis of sub-micron, micron or milli sized carbon beads.

BACKGROUND

Spherical carbon particles, within a size range of 1-80 microns, produced during refining of spinning pitch are known as carbon beads. The carbon beads come in three purity grades such as green, carbonized and graphitized powder. They are used as a composite material with new functions taking advantage of electric conductivity, thermal conductivity and other characteristics. The carbon beads are also known as mesocarbon microbead, spherical carbon fine particle, spherical carbon powder, carbosphere, spherical carbon particles, spherical round ball etc.

Conventionally, the carbon beads with sub-micron, micron or milli-sized carbon beads structures are assembled using starting material selected from pristine carbon materials (e.g., carbon black, activated charcoal, pyrolytic or natural graphite, diamond, graphene, single- or multi-walled carbon nanotubes, fullerenes or metallofullerenes) or carbon materials functionalized with molecules or polymers.

Over the last four decades, a variety of processes have been explored to synthesize carbon microbeads. U.S. Pat. No. 4,263,268A disclosed a process for synthesising the carbon microbeads, where the disclosure talks about synthesising porous graphitic carbon compositions using carbon-rich polymeric sources deposited into sacrificial inorganic templates followed by removal of the template and pyrolysis. Aromatic hydrocarbons such as coal tar, heavy oil residue and pitch have been shown to form mesophase carbon beads during liquid phase carbonization (refer to, Lü, Y. et al. Preparation of mesocarbon microbeads from coal tar Journal of Materials Science 34, 1999). Pyrolytic graphite shells have been synthesized via a flame pyrolysis process. However, each of these methods involves harsh conditions (e.g., elevated temperatures), and provide suboptimal or no control to tailor the bead sizes.

Lalwani et al., 2016, in the paper, Two- and three-dimensional all-carbon nanomaterial assemblies for tissue engineering and regenerative medicine, published in the journal Annals of Biomedical Engineering, disclosed an assembly of 3-D micro and milli-scopic structures using carbon nanotubes and graphene, where the disclosure talks about successfully assembly of 3-D micro and milli-scopic structures using carbon nanotubes and graphene by "bottom-up" (e.g., chemical vapor deposition) or "top-down" (e.g., capillary-induced self-assembly) approaches. However, these structures are brittle, and structural integrity is insufficient for use in applications that require high mechanical strength or under dynamic mechanical loading and unloading forces. These conditions are experienced in vivo by biomedical implants or ex vivo by stationary phase material for filtration and/or separation. The dynamic stresses caused by constant loading and unloading cycles in tissues (e.g., bone) or under fluid flow (in a chromatography column) cause fatigue and loosen the 3D structure leading to its crumbling or fragmentation. Furthermore, significant batch-to-batch variability in porosity and pore size of carbon micro and milli-scopic structures were noted. However, employing these carbon material-binder compositions to synthesize all carbon micro and mill-scopic structures in the form of microspheres of various sizes in a controlled manner has not been demonstrated.

Choi, A. et al., 2017 in, recent advances in engineering microparticles and their nascent utilization in biomedical delivery and diagnostic applications, disclosed a process for synthesis of microspheres, where the disclosure explains about synthesis of microspheres mainly using unsaturated polymers by employing traditional emulsion free-radical polymerization by manual or mechanical (using sonicators and homogenizers) agitation. Patent application bearing number WO2014070987A1 discloses the adaption of the above method and use of carbon materials such as carbon black, carbon nanotubes and graphene as stabilizing agents in water/oil spherical droplets known as pickering emulsions. Shah, R. K. et al., 2008, in their paper, Designer emulsions using microfluidics, published in the journal Materials Today 11, disclosed issues include polydispersity, poor reproducibility with these traditional methods have led to development of sophisticated emulsification methods like membrane extrusion, viscoelastic shear, and micro-thread generation. Spray devices, also known as atomizers, applicators, sprayers, or nozzles) that discharge liquid at high velocity into a gaseous phase (usually slowly moving air), or utilizing electrical or ultrasonic pressure to generate droplets have been used in material synthesis (as referred in the papers by D'Addio et al., 2013, Taksima, T. et al., 2015, and a US patent bearing number U.S. Pat. No. 7,131,597B2). Chinese patent bearing number CN104525070A discloses, employing the atomization technique, microbeads employing a mix of carboxylic acid-functionalized carbon nanotubes and other additives. However, these techniques provide inadequate control over the size of the micro-droplets.

Microfluidic-based reproducible micron-sized droplet generation for material synthesis has emerged as promising techniques (as referred in the papers by Choi, A. et al., 2017 and Shah, R. K. et al., 2008). Here, material (typically monomers or polymers that undergo radical polymerization) is dispersed in an organic or aqueous phase. Droplets of these dispersions are generated within milli- or microfluidic channels and material trapped within the droplet undergo radical polymerization in situ to take the shape of the microspheres. These methods allow for much higher precision and repeatability compared to conventional atomization techniques.

Passive and active methods are employed to generate droplets within microfluidic channels. Passive methods of droplet generation rely on instabilities formed at the interface of two low viscosity immiscible liquid phases to produce particular droplet geometries at set velocities (as referred in the paper by Joanicot, M. et al., 2005). Deformations in the phases' interfacial boundary, and subsequent break-up, are driven by forces contained within and provided by the phases themselves as they merge and pass through confined channels. Passive methods also encompass manipulating the intrinsic properties of the materials (viscosity, interfacial tension, channel wettability, fluid density) to tune droplet break-up (as referred in the paper by Zhu, P. et al., 2017). Typically, one fluid is water (aqueous phase), and the other one is an organic solvent (oil phase, e.g., tetradecane or hexadecane). The fluid phase, which preferentially wets the channel walls, will be the continuous phase (outer phase), while the fluid which interacts less favourably with channel walls forms droplets (inner phase) (as referred in the paper by Joanicot, M. et al., 2005). The outer carrying-fluid is referred to as the continuous phase and inner droplet-forming-fluid as the dispersed phase. Thus, if water is the continuous phase, oil droplets are formed. If oil is the continuous phase, water droplets are formed. Active methods employ additional energy such as: electrical, magnetic, centrifugal, optical, thermal, or mechanical to create or enhance the phase instability.

Microfluidic-based droplet generation technologies have mainly been explored for low viscous dispersions to generate spherical soft gel or hydrophobic polymeric microparticles (as referred in the papers by Choi, A. et al., 2017, Shah, R. K. et al., 2008, Chu, L. Y. et al., 2007 and Kim, D. Y. et al., 2018).

End-to-end microfluidic-based manufacturing solutions that uses viscous raw material as input and produces final dried products as output (customized to composition, density, size, shape, or porosity) are unavailable in the market. Current commercially available technologies are unsuitable or cannot be directly adapted for viscous slurries of the carbon materials that can generate hard all-carbon microspheres due to the following reasons:

a) Requires customized set up that can handle viscous carbon slurries: The majority of commercially available microfluidics systems use pure water as the dispersed phase, and the continuous phase is an oil (silicone, or a hydrocarbon oil like decane). The materials used to fabricate the microfluidic channels in these chips are hydrophobic (e.g., made using Polydimethylsiloxane (PDMS)). The outer oil continuous phase (which is hydrophobic) preferentially wets the chip surface ensuring proper droplet formation. However, these chips are unsuitable for carbon materials. The carbon materials disperse well in select organic fluids (e.g., ethyl acetate). Thus, the disperse phase to generate droplets is this organic fluid with the carbon slurry (considered as "oil"). The continuous phase is water (a polar solution). The surfaces of glass or quartz channels are hydrophilic and ensure that the polar water-based continuous phase preferentially wets the chip surface for droplet formation. Thus, microfluidic set up with glass channels are required.

The commercially available microfluidic setups work sufficiently well with low viscous solutions. To provide some perspective on the viscosity values used in these setups, the viscosity of water is 0.89 mPa·s, oils, or organic solvents used in typical microfluidic devices are between 1 (e.g., decane) and 50 (e.g., safflower oil) mPa·s. However, droplets formed, using carbon dispersions in these viscosity ranges, have an insufficient amount of carbon material per droplet. High viscous carbon slurries (>100 mPa·s) are required. The flow pressures achievable with commercially available microfluidic syringe pumps are insufficient to push the highly viscous slurry preparations through the nozzle. The high-pressure syringe pump, depending on the syringe size, allows maximum pressures between 65-600 psi that do not generate uniform flow rates with the viscous carbon slurries. High viscosity droplets generation, employing phase inversion techniques (as referred in the papers by Man, J. et al., 2017, Chen, H. et al., 2017, and Li, J. et al., 2018) have still not demonstrated the capability to create droplets tailored to specific sizes.

b) Requires customized set up for post-processing of the generated droplets into solid spheres. Low-density carbon slurry droplets once formed are buoyant. They immediately rise in the continuous phase, breaking apart as they reached surface. Thus, the carbon material within the droplets needs to be held together to form spheres within the time it takes to rise to the surface. Alternately, the timeframe during which the carbon spheres rise to the surface needs to be extended to provide sufficient time to bind together to maintain its spherical conformation.

As mentioned above, to cure the drops, UV activated polymerization techniques have been employed. However, not all UV-activable crosslinkers can be used with carbon slurries. The right proportion of carbon material and binder is needed to ensure a hard-cured drop (total binding through the entire volume of the droplet sphere) within the time constraints, as stated above. Instant UV-based crosslinking methods or binders that lead to quick curing for other hybrid spheres do not work in a similar manner or efficiency with carbon materials (as referred in the paper by Kim, D. Y. et al., 2018). The reason for this discrepancy is as follows. Photoinitiators used for UV curing find absorbance in the 250-400 nm spectral range. Glass filters out most of the shorter wavelengths emitted by a UV source. Optimal curing conditions require direct contact unobstructed by glass tubing or containment vessel. The black color of the carbon material slurry further adds to the challenge. Opaque nature of the slurry reduces the efficiency of the UV light from penetrating into each drop to facilitate complete curing. Thus, right combination or composition of the carbon, binder, and any other additional additive needs to be determined that will lead to mechanically stable microspheres that do not agglomerate within the constraints posed by the generation method.

c) Requires additional changes in the slurry preparation and processing steps for any further structural (e.g., porosity) or functional (e.g., mechanical property) changes in the spheres. For example, changes in porosity could be accomplished by adding porogen (e.g., sodium chloride, Silica or polystyrene particles) following by leaching or etching of the porogen (as referred in the papers by Ma, P. X., 2001, and Haugan, E. et al., 2011) or temperature annealing (Striemer, C. C. et al., 2007, and Striemer, C. C. et al., 2006). Additional changes in chemical properties (e.g., hydrophobicity) and/or physical properties (e.g., electrical, thermal, or magnetic properties) would require functionalization of the carbon material or incorporation of atoms or molecules into the carbon slurry (e.g., Copper to modulate electrical conductivity or iron to modulate magnetic properties). Tailored sphere preparation protocols will be required that address the specific manufacturing constraints posed by these changes.

Hence, there is a need for an improved process for synthesizing the carbon micro beads and a suitable composition of carbon micro beads.

BRIEF DESCRIPTION

In accordance with an embodiment of the present invention, a process for synthesis of carbon beads is provided. The process includes preparing a viscous slurry in a non-polar solvent configured to function as a disperse phase. The viscous slurry is prepared using a binder or a crosslinker molecule or a radical polymerization initiator and at least one carbon material. Each of the binder and the crosslinker molecule includes a plurality of terminal carbon double bond groups and a spacer group. The process also includes preparing a viscous gel using one or more hydrocolloids, wherein the viscous gel is configured to function as a continuous phase. In the next step, the process includes passing the disperse phase and the continuous phase into a microfluidic droplet generator to obtain spherical droplets of a predefined size. The process further includes, subjecting the spherical droplets to a thermal treatment or UV radiation to obtain spherical particles of carbon beads. The process also includes, drying the spherical particles of carbon beads to obtain the carbon beads of a predefined dimension.

In accordance with another embodiment of the present invention, the process for synthesis of carbon beads further includes adding a first additive to the viscous slurry. First additive is selected from a group consisting of radical accelerators, porogens, one or more atoms and one or more molecules that modulate the optical, electrical, acoustic, thermal or magnetic properties.

In accordance with yet another embodiment of the present invention, the process for synthesis of carbon beads further includes adding a second additive to the viscous gel for controlling size of the spherical droplets. The second additive is selected from a group consisting of ammonium sulfate and sodium chloride.

In accordance with an embodiment of the present invention, the process for synthesis of carbon beads further includes functionalizing at least one of interior structures and an exterior surface of the carbon beads with atom or molecule or macromolecule through a covalent or a non-covalent bonding. The interior structures comprise at least one of micro pores, meso pores, and macro pores.

In accordance with another embodiment of the present invention, a composition for synthesis of carbon beads is provided. The composition for synthesis of carbon beads includes a viscous slurry as a disperse phase, and a viscous gel as a continuous phase. The viscous slurry includes 0.1 to 20 wt % of a carbon material, 50 to 99 wt % of a binder or a crosslinker molecule, and 1 to 3 wt % of a suitable radical polymerization initiator. The binder and the crosslinker molecule comprise one or more terminal carbon double bond groups and a spacer group. The radical polymerization initiator includes benzoyl peroxide (BP) or 2,2-azo-bis-isobutyronitrile (AIBN) or 2-Hydroxy-2-methyl-propiophenone or Diphenyl iodonium nitrate or any combination thereof. The viscous gel forms around 0.05 to 5 wt % of the composition. The viscous gel includes hydrocolloids.

In accordance with yet another embodiment of the present invention, the viscous slurry of the composition for synthesis of carbon beads further includes a first additive, wherein the first additive is selected from a group consisting of radical accelerators, porogens, atoms and molecules.

In accordance with yet another embodiment of the present invention, the viscous gel of the composition for synthesis of carbon beads further includes a second additive for controlling size of the spherical droplets, wherein the second additive is selected from a group consisting of ammonium sulfate and sodium chloride.

In accordance with an embodiment of the present invention, a microfluidic droplet generator for synthesis of spherical particles of carbon beads having at least one of sub-micron size, micron size and milli-size is provided. The microfluidic droplet generator includes a continuous phase pressure tank configured to hold a viscous gel as a continuous phase. The microfluidic droplet generator also includes a continuous phase pressure regulator with or without a pulse solenoid) fluidically coupled to continuous phase pressure tank, wherein the continuous phase pressure pulse solenoid is configured to control a flow rate and a pattern of the continuous phase. The microfluidic droplet generator further includes a metered pressure pump fluidically connected to a slurry reservoir, wherein the metered pressure pump (e.g. syringe pump) is configured to control flow of a viscous slurry as a disperse phase loaded into the slurry reservoir. The microfluidic droplet generator includes a hydrophilic co-flow nozzle fluidically connected to the continuous phase pressure regulator with or without pulse solenoid and the slurry reservoir. The hydrophilic co-flow nozzle is configured to allow mixing of the continuous phase and the dispersed phase. The microfluidic droplet generator further includes a hydrophilic reaction chamber fluidically coupled to the hydrophilic co-flow nozzle, wherein the hydrophilic reaction chamber is configured to carry hydrophilic reactions for synthesis of spherical shaped particles of carbon beads.

To further clarify the advantages and features of the present invention, a more particular description of the invention will follow by reference to specific embodiments thereof, which are illustrated in the appended figures. It is to be appreciated that these figures depict only typical embodiments of the invention and are therefore not to be considered limiting in scope. The invention will be described and explained with additional specificity and detail with the appended figures.

BRIEF DESCRIPTION OF THE DRAWINGS

The disclosure will be described and explained with additional specificity and detail with the accompanying figures in which.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more components, compounds, and ingredients preceded by "comprises . . . a" does not, without more constraints, preclude the existence of other components or compounds or ingredients or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present invention relate to a process for synthesis of carbon beads and a composition of carbon beads. The present invention also provides carbon beads of spherical structures with controlled size, morphology, porosity and physico-chemical properties. The controlled size of spherical carbon beads includes sub-micron size, micron size or milli size.

Figure 1:
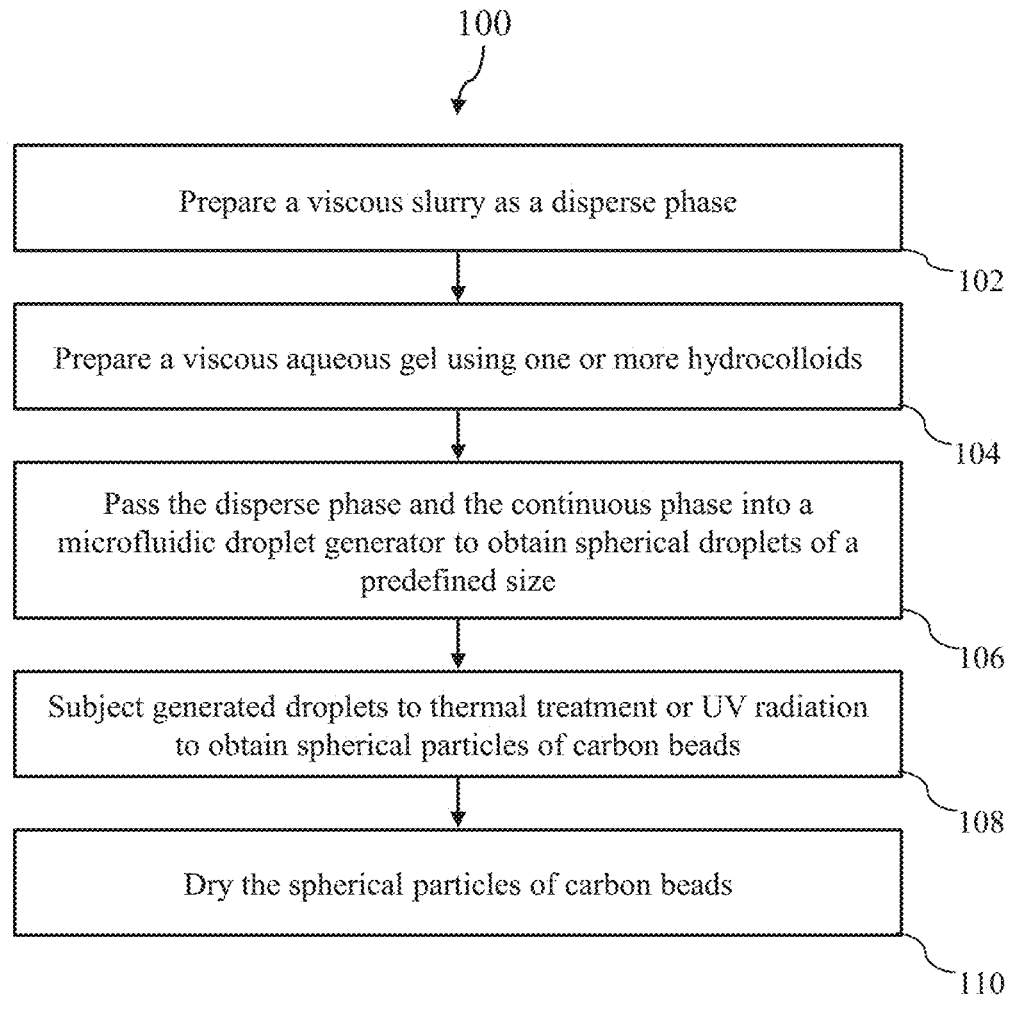
FIG. 1 is a flow diagram representing steps involved in the process for synthesis of carbon beads in accordance with an embodiment of the present invention.

FIG. 1 is a flow diagram representing steps involved in the process 100 for synthesis of carbon beads in accordance with an embodiment of the present invention. The process 100 mainly uses viscous polar solution as a continuous phase and viscous non-polar solution as a disperse phase into a microfluidic system unlike conventional microfluidic system.

The process 100 for synthesis of carbon beads begins with preparing a viscous slurry in a non-polar solvent configured to function as a disperse phase at step 102. The viscous slurry is prepared of >100 mPa·s. The disperse phase flows as an inner phase. The viscous slurry is prepared using one of a binder, a crosslinker molecule, a radical polymerization initiator, and at least one carbon material. Each of the binder and the crosslinker molecule comprises a plurality of terminal carbon double bond groups and a spacer group. In an embodiment, the one or more terminal carbon double bond groups include, but not limited to, polyfunctional acrylic groups such as methacrylate, acrylate, or aromatic groups such as styrene. In an embodiment, the spacer group is a compound including at least one of hydrophobic chains, hydrophilic chains, amphiphilic chains or any combination thereof. In an embodiment, the carbon material carbon material is selected from a group consisting of graphite, graphene, carbon black, activated charcoal, nano-diamond, carbon nanotubes, and fullerenes. The radical polymerization initiator comprises one of benzoyl peroxide (BP), 2,2-azo-bis-isobutyronitrile (AIBN), 2-Hydroxy-2-methyl-propiophenone and Diphenyl iodonium nitrate.

The viscous slurry should have enough flow to be passed or pushed through a metered pressure pump, wherein viscosity of the viscous slurry is dependent on type of the carbon material. For example, a viscosity of 206.5 mPa·s is required for graphite material slurry mixture. Any viscosity above this value was found to be semisolid in nature and difficult to push through micro channels or the metered pressure pump. The binder or crosslinker in liquid form is considered ideal, addition of solvent such as dodecane and hexane up to 10 ml/mg of the sample may be added to dilute the mixture to achieve flow conditions. The term "disperse phase" as used herein refers to a phase that is composed of particles that are distributed through another phase. The dispersed phase in present context is a discontinuous phase. In an embodiment, the metered pressure pump may include a syringe pump.

In an alternative embodiment of the present invention, the viscous slurry is prepared into a polar solvent at step 102 (not shown in FIG. 1). The viscous slurry prepared in the polar solvent is configured to function as a disperse phase, where the disperse phase flows as an inner phase. The polar solvent used herein may be selected from water, methanol, ethanol, and the like.

In an embodiment, a viscous gel is prepared using one or more hydrocolloids at step 104. The viscous gel is configured to function as a continuous phase. The continuous phase flows as an outer phase. The viscous gel is prepared in a polar media, which is in turn immiscible in a non-polar solvent. The one or more hydrocolloids are selected from a group consisting of xanthan gum, gum arabic, polyvinyl alcohol (PVA), polyvinylpyrrolidone (PVP), polyethylene glycol (PEG) or a derivative or a combination thereof. The one or more hydrocolloids configured to protect newly formed droplets against flocculation and coalescence and increase the viscosity of the continuous phase. The term "continuous phase" as used herein refers to a phase into which particles are dispersed.

In an alternate embodiment of the present invention, the viscous gel is prepared in non-polar solvent which is immiscible in the polar solvent at step 104 (not shown in FIG. 1). The viscous gel is configured to function as the continuous phase, where the continuous phase flows as the outer phase.

In an embodiment, the disperse phase and the continuous phase are passed into a microfluidic droplet generator to obtain spherical droplets of a predefined size at step 106. The predefined size of the spherical droplets include a a range of size of 10 mm to 100 nm. In a preferred embodiment, the predefined size of the spherical droplets ranges between 10 µm to 90 µm. A diameter of the spherical droplets and thereby size of microbead may be controlled (decreased or increased) by modulating a phase flow velocity and reducing inner phase slurry reservoir size. Once non-polar carbon slurry droplets are formed in the polar continuous phase, they automatically assume a spherical conformation due to the thermodynamic principle of minimum interfacial energy. The content inside the spherical droplets need to bind together completely to achieve the required mechanical stability, get separated from the highly viscous continuous phase, be washed and dried to create useable hard beads.

In the present invention, theoretical value of radius r of the spherical droplets, formed using the equation given by Thorsen et al., wherein the equation is as follows:

$$r \approx \frac{\gamma}{\mu \dot{\varepsilon}}, \qquad \text{Eq. 1}$$

where, $\gamma$=interfacial tension between the water/oil-s,
$\mu$=viscosity of the continuous phase and
$\dot{\varepsilon}$=shear rate$\approx 2U/r_c$, where, U=velocity of fluid and
$r_c$=channel radius.
A factor of two difference was noted between an actual and a predicted droplet sizes.

In the present invention, various empirical experiments were performed due to the unpredictability and number of variables with no firm guidance from the prior art. Refinement of droplet formation indicated that the spherical droplets may be achieved through varying the phase velocity parameters. It is observed that an outer phase must flow much faster than the inner phase to produce desired monodispersed spherical droplets. Such results provide an insight that the droplet diameter and thus the microbead size can be controlled (decreased or increased) by modulating the phase flow velocity and reducing inner phase slurry reservoir size. Employing the equation 1 for synthesizing carbon beads, the expected droplet diameter was computed as 776 µm, where an actual droplet diameter obtained is equal to 90 µm with an error of 762%.

In an embodiment, the spherical droplets are subjected to a thermal treatment or UV radiation to obtain spherical particles of carbon beads at step 108. Subjecting the droplets to UV radiation or thermal treatment facilitates in situ polymerization and hardening of slurry mixture as they flow into a capture vessel. In an embodiment, the thermal treatment was given using a temperature oven.

Further, the spherical particles of carbon beads are dried to obtain the carbon beads of a predefined dimension at step

110. The predefined dimension of the carbon beads includes at least one of a sub-micron size, micron size and milli-size. Post-synthesis processing of the spherical particles of carbon beads is modulated to enhance their physico-chemical. Example of post-synthesis processing include temperature annealing to enhance the electrical conductivity and mechanical properties of the particle to withstand extreme pH and high temperatures, and modulating a pore size and porosity of the carbon beads.

In an exemplary embodiment, the post-synthesis processing of carbon beads include temperature annealing to enhance the electrical conductivity and mechanical properties of the particles, to withstand extreme acidic and basic pH ranges from pH 1 to pH 14, and high temperatures ranging from a room temperature to 100° C.

In a further embodiment of the process 100 for synthesis of the carbon beads also includes adding a first additive to the viscous slurry to enhance physico-chemical properties of the spherical particles of the carbon beads. The first additive includes one or more radical accelerators, one or more porogens, and one or more atoms and one or more molecules that may manipulate one of an optical property, an electrical property, an acoustic property, a thermal property and a magnetic property of the spherical particles of carbon beads. The addition of radical accelerators, porogens, atoms or molecules to the viscous slurry enables modulating the pore size of the spherical particles of carbon beads between 0.1 nm to 500 µM and porosity range between 1% to 99%.

The one or more radical accelerators are added to improve the mechanical properties of the carbon beads of spherical shaped particles. In an embodiment, the radical accelerators are selected from a group consisting of methyl ethyl ketone hydroperoxide, t-butyl hydroperoxide, cumylhydroperoxide, p-isopropyl cumyl hydroperoxide, cobalt naphthenate, and cobalt acetylacetonate.

The one or more porogens are added to modulate pore size and porosity of the carbon beads of spherical shaped particles. In an embodiment, the porogens are selected from a group consisting methanol, ethanol, 1-propanol, 2-propanol, I-butanol, 1,4-butanediol, cyclohexane, benzene, toluene, and NaCl crystals.

In an embodiment, for modulating the optical property of the spherical particles of carbon beads, the one or more atoms and the one or more molecules may be selected from a group comprising nano tubes (e.g., vanta black), nanodiamond, silica, aluminium, silver, gold, organic fluorophores, lanthanoids or derivatives or combination thereof.

In another embodiment, for modulating the electrical property of the spherical particles of carbon beads, the one or more atoms and the one or more molecules may be selected from a group comprising copper, gold, silver, and aluminium.

In yet another embodiment, for modulating the acoustic property of the spherical particles of carbon beads, the one or more atoms and the one or more molecules may be selected from a group comprising sulfur hexafluoride and barium.

In an embodiment, for modulating the thermal or the magnetic property of the spherical particles of carbon beads, the one or more atoms and the one or more molecules may be selected from a group comprising iron, nickel, cobalt and their oxides of the same.

In a further embodiment of the process 100 for synthesis of the carbon beads, the process 100 includes adding a second additive to the viscous gel for controlling size of the spherical droplets. The second additive is selected from a group consisting of ammonium sulfate and sodium chloride.

The ammonium sulfate and sodium chloride being added to enforce hydrophobic interactions, by increasing the order of cages of polar media created around the hydrophobic slurry.

In a further embodiment of the process 100 for synthesis of the carbon beads, the process 100 also includes functionalizing interior structures and/or an exterior surface of the carbon beads with at least one of atom, molecule, and macromolecule through a covalent or a non-covalent bonding. In such embodiment, the interior structures include at least one of micro pores, meso pores, and macro pores. The modulation into the covalent or non-covalent functioning of interior and exterior surface of the carbon beads of spherical shape with atoms, molecules and macromolecules is carried to change hydrophobicity, surface charge, or affinity to particular analytes.

In another embodiment of the present invention, a composition 200 for synthesis of carbon beads is provided. The composition 200 includes a viscous slurry as a disperse phase, and a viscous gel as a continuous phase. The viscous slurry includes 0.1 to 20 wt % of a carbon material, 50 to 99 wt % of a binder or a crosslinker molecule, and 1 to 3 wt % of a suitable radical polymerization initiator.

In an embodiment, the carbon material is selected from a group consisting of graphite, graphene, carbon black, activated carbon, carbon nanotubes, fullerenes, nano-diamond or a combination thereof.

In another embodiment, each of the binder and the crosslinker molecule comprises one or more terminal carbon double bond groups and a spacer group. The one or more terminal carbon double bond groups include, but not limited to, polyfunctional acrylic groups such as methacrylate, acrylate, or aromatic groups such as styrene. The spacer group is a compound comprises at least one of hydrophobic chains, hydrophilic chains, amphiphilic chains or combination thereof.

In yet another embodiment, the radical polymerization initiator comprises one of 2-Hydroxy-2-methyl-propiophenone, and Diphenyl iodonium nitrate. The radical polymerization initiator allows in situ rapid crosslinking of the double bonds. The radical polymerization initiator functions as UV-photoinitiator. Photoinitiators used for UV curing find absorbance in the 250-400 nm spectral range, hence it is necessary to initiate UV-photoinitiation through direct irradiation unobstructed by glass tubing or containment vessel.

In an embodiment, the composition 200 includes 0.05 to 5 wt % of viscous gel. In such embodiment, the viscous gel includes one or more hydrocolloids. The one or more hydrocolloids are selected from a group consisting of xanthan gum, gum arabic, polyvinyl alcohol (PVA), polyvinylpyrrolidone (PVP), polyethylene glycol (PEG) or a derivative or combination thereof. The one or more hydrocolloids are configured to protect newly formed droplets against flocculation and coalescence and increase viscosity of the continuous phase. The increase in the continuous phase viscosity using the one or more hydrocolloids may perform three essential functions such as suspending the generated spherical droplets with its material content "in place"; significantly slowing their migration to the surface to prevent rupture due to an imbalance in surface tension, readily forming spherical droplets due to an increase in the shear forces leading to more developed deformations in the interfacial boundary between the merging immiscible phases, and controlling the size of the droplets. The hydrocolloids being added to the continuous phase i.e. polar or aqueous phase.

In an alternate embodiment, to generate moisture-free carbon beads in applications such as active materials for battery electrode applications, the one or more hydrocolloids are added to other protic polar media (immiscible in the organic disperse phase) such as ethanol, ether, or acetone.

In a further embodiment of the composition 200 for synthesis of carbon beads, the viscous slurry also includes a first additive. The first additive is selected from a group consisting of the one or more radical accelerators, the one or more porogens, the one or more atoms and the one or more molecules. The one or more radical accelerators are added to improve the mechanical properties of the carbon beads of spherical shaped particles. The one or more porogens being added to modulate pore size and porosity of the carbon beads of spherical shaped particles. The one or more atoms or molecules being added to manipulate the optical, electrical, acoustic, thermal or magnetic properties of the spherical particles of carbon beads. The addition of radical accelerators, porogens, atoms or molecules to the viscous slurry enables modulating the pore size of the spherical particles of carbon beads between 0.1 nm to 500 $\mu$M and porosity range between 1% to 99%.

In a further embodiment of the composition 200 for synthesis of carbon beads, the viscous gel also includes a second additive for controlling size of the spherical droplets. The second additive is selected from a group consisting of ammonium sulfate and sodium chloride. The ammonium sulfate and sodium chloride are added to enforce hydrophobic interactions, by increasing the order of cages of polar media created around the hydrophobic slurry. The first additive allows covalent and a non-covalent functionalization of the interior structures and the exterior surface of the carbon beads with at least one of the one or more atoms, the one or more molecules, and one or more macromolecules to change the carbon beads' hydrophobicity, surface charge, and affinity to particular analytes. The interior structures consist of micro pores, meso pores, and macro pores.

Figure 2A:
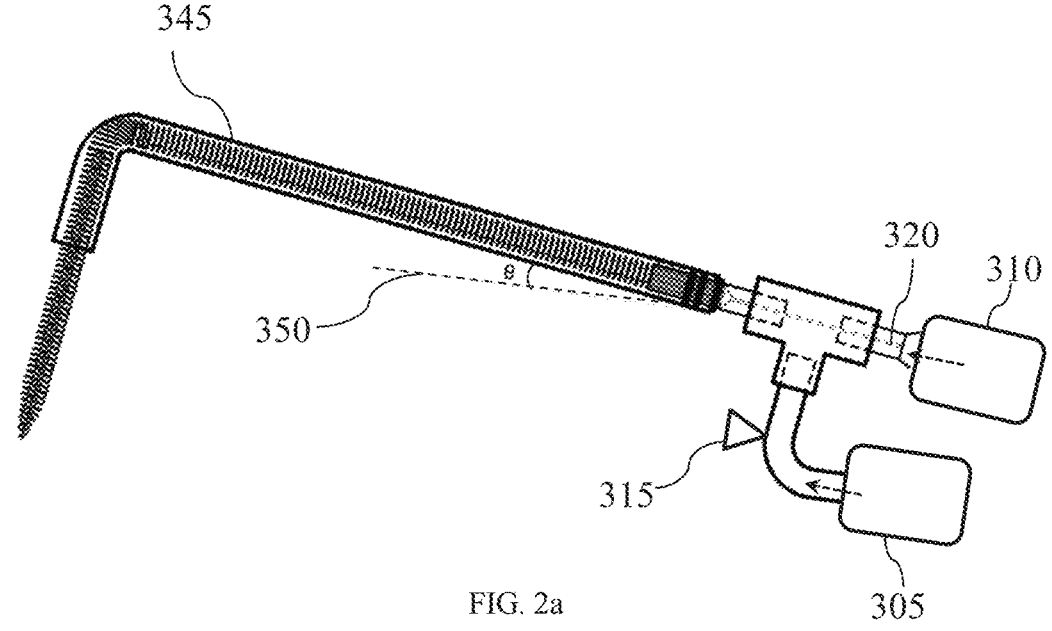
FIG. 2a is a schematic representation of a microfluidic droplet generator in accordance with an embodiment of the present invention.

In yet another embodiment of the present invention, a microfluidic droplet generator 300 is provided for the synthesis of the carbon beads with at least one of sub-micron size, micron size and milli-size. FIG. 2a is a schematic representation of the microfluidic droplet generator 300 in accordance with an embodiment of the present invention.

As used herein the term "microfluidic droplet generator" refers to a device for generating highly reproducible micro sized droplets. The microfluidic droplet generator 300 enables generating droplets with much higher precision and repeatability compared to conventional methods. The microfluidic droplet generator 300 provides desired size droplets at required flow rates and volumes.

In an embodiment, the microfluidic droplet generator 300 includes a continuous phase pressure tank 305 configured to hold the viscous gel as a continuous phase. The continuous phase pressure tank being pressurized, after loading the viscous gel, to enable flow of the viscous gel. The continuous phase pressure tank 305 is also referred as continuous phase reservoir.

In an embodiment, the microfluidic droplet generator 300 also includes a continuous phase pressure regulator 315 with or without a pulse solenoid fluidically coupled to continuous phase pressure tank 305. The continuous phase pressure regulator 315 is configured to control flow rate and pattern of the continuous phase. The continuous phase pressure regulator 315 is also referred as continuous phase pressure regulator.

In an embodiment, the microfluidic droplet generator 300 also includes a metered pressure pump 320 fluidically connected to a slurry reservoir 310 filled with the viscous slurry. In an embodiment, the metered pressure pump may include a syringe pump. The metered pressure pump 320 is config-ured to control flow of the viscous slurry as a disperse phase loaded into the slurry reservoir 310. In one embodiment, the pump 320 includes HPLC pump. The HPLC pump enables providing high pressures in a range of 5000-7000 psi. The high pressure generates uniform flow rates. In one embodi-ment, the slurry reservoir 340 configured to optimize droplet snap-off fabricated with various internal diameters i.e., 300 μM to <20 μM.

Figure 2B:
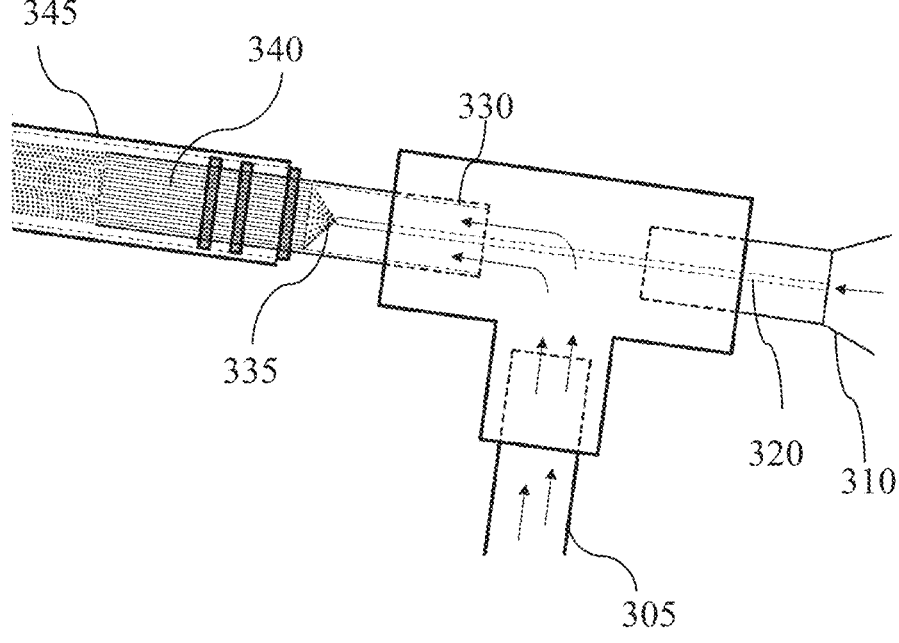
FIG. 2b is a schematic representation of an blown up view of a portion of the microfluidic droplet generator in accordance with an embodiment of the present invention.

Referring to FIG. 2*b*, it is shown that the microfluidic droplet generator 300 also includes a hydrophilic co-flow nozzle 330 fluidically connected to the continuous phase pressure tank 305 via the continuous phase pressure regu-lator 315 and the slurry reservoir slurry reservoir 310. The hydrophilic co-flow nozzle 330 is configured to allow mix-ing of the continuous phase and the dispersed phase at a converging section 335. The continuous phase and dispersed phase meet at the hydrophilic co-flow nozzle 330 and shear forces between the flowing immiscible fluids cause the droplet snap-off in a region 340 formed by a plurality of glass capillary tubes acting as hydrophilic vessels. Hydro-philic surface chemistry of the hydrophilic nozzles 325, 330, and 340, and a reaction chamber 345 ensures that the continuous phase being the "outer phase" keeping the hydro-phobic dispersed phase as isolated drops in a centre of the hydrophilic nozzles 325, 330, and 340. The microfluidic droplet generator 300 enables replacing commercially avail-able nozzles and allow control of the size of individual droplets. The control over shear forces between the fluid phases in the hydrophilic co-flow nozzle 330 delivers pre-cise control over droplet snap-off, thereby enabling to set droplet volumes.

In an embodiment, the microfluidic droplet generator 300 includes the hydrophilic reaction chamber 345 including a UV lamp and fluidically coupled to the hydrophilic co-flow nozzle 330. In such embodiment, the hydrophilic reaction chamber 345 is configured to have a predesigned inclination angle θ with reference to an axis 350. The hydrophilic reaction chamber 345 is configured to carry hydrophilic reactions for synthesis of spherical shaped particles of carbon beads. In an exemplary embodiment, the droplets obtained by the microfluidic droplet generator comprise 90 μm size. The droplet diameter and thus the spherical par-ticles of carbon beads size may be controlled (decreased or increased) by modulating the phase flow velocity and reduc-ing inner phase slurry reservoir size (internal diameter of the slurry reservoir 310). The microfluidic droplet generator 300 mainly uses polar solution as a continuous phase and non-polar solution as a disperse phase unlike conventional microfluidic system.

The spherical particles of carbon beads may include micro size (also referred as carbon microbeads) synthesized using the process 100, the composition 200 and the microfluidic droplet generator 300 provided by the present invention being examined for properties such as pore diameter, poros-ity, and mechanical properties.

Figure 3:
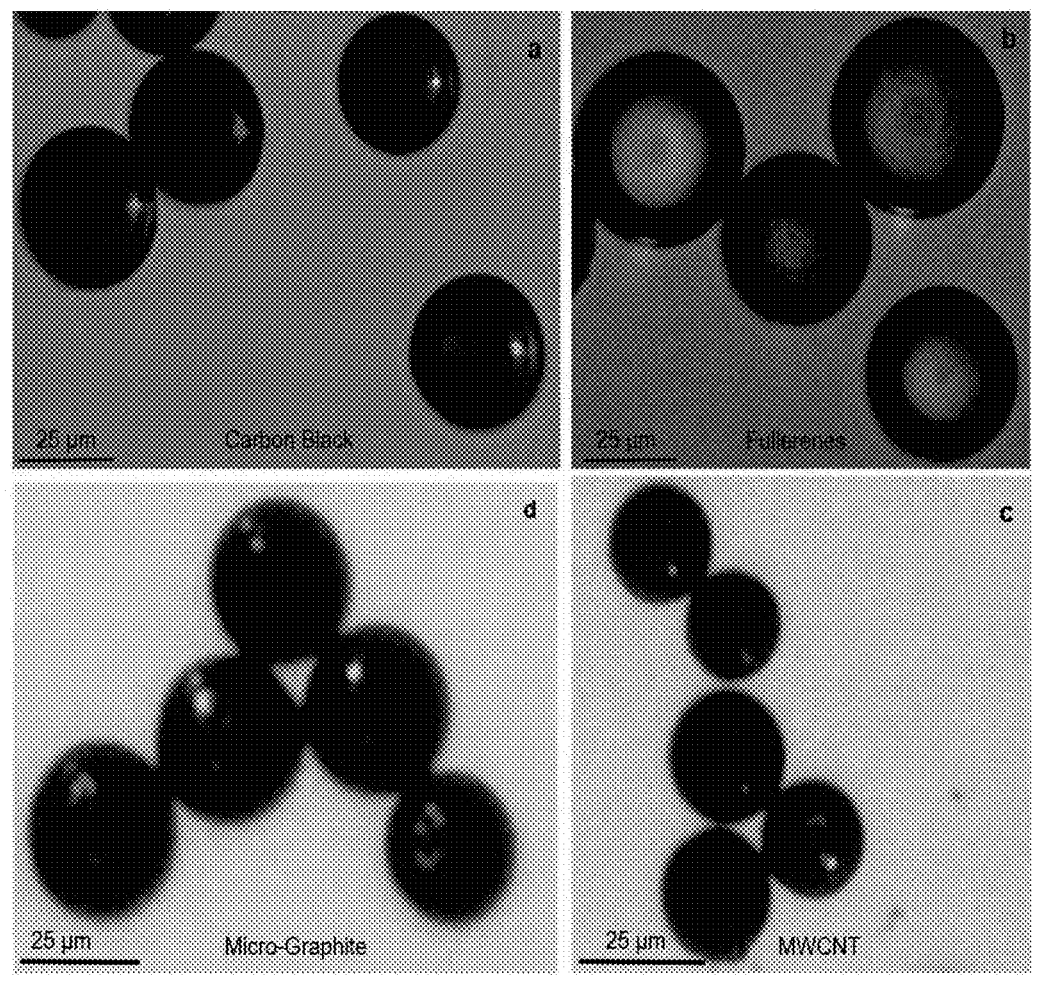
FIG. 3 represents a bright-field optical microscopy images of carbon microbeads prepared using various pristine carbon materials and decane diol diacrylate or butane diol dimethacrylate as binder in accordance with an embodiment of the present invention.

FIG. 3 represents a bright-field optical microscopy images of carbon microbeads prepared using various pristine carbon materials and decane diol diacrylate or butane diol dimeth-acrylate as binder in accordance with an embodiment of the present invention. First image shows the carbon microbeads formed using carbon black. Second image shows the fuller-enes formed using carbon black. Third image shows the carbon microbeads formed using micro-graphite. Forth image shows the carbon microbeads formed using Multi-Walled Carbon Nanotubes.

Figure 4:
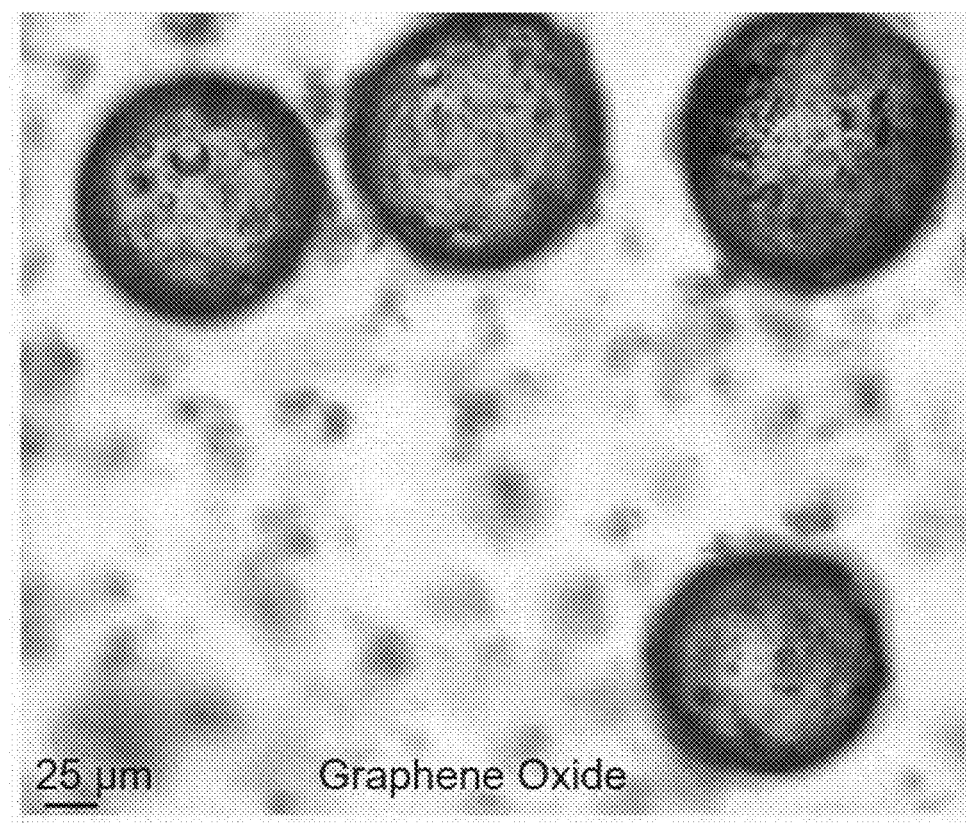
FIG. 4 represents a bright-field optical microscopy image of the carbon microbeads prepared using graphene oxide and polyethylene glycol (PEG) diacrylate as binder in accordance with an embodiment of the present invention.

FIG. 4 represents a bright-field optical microscopy image of the carbon microbeads prepared using graphene oxide and polyethylene glycol (PEG) diacrylate as binder in accor-dance with an embodiment of the present invention.

Figure 5:
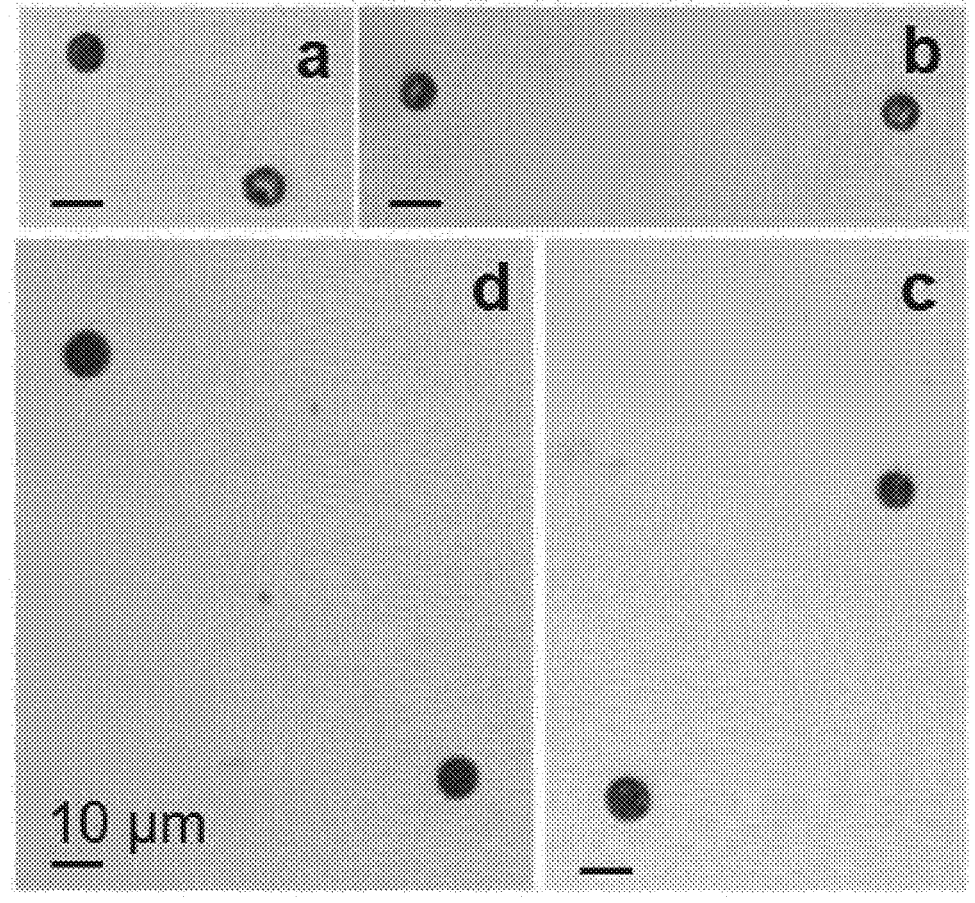
FIG. 5 represents a bright-field optical microscopy images of smaller carbon microbeads (<10 μm diameter) prepared using various pristine micro-graphite and decane diol dimethacrylate or butane diol dimethacrylate as binder in accordance with an embodiment of the present invention.

FIG. 5 represents a bright-field optical microscopy images of smaller carbon microbeads (<10 μm diameter) prepared using various pristine micro-graphite and decane butane diol dimethacrylate as binder in accordance with an embodiment of the present invention.

Figure 6:
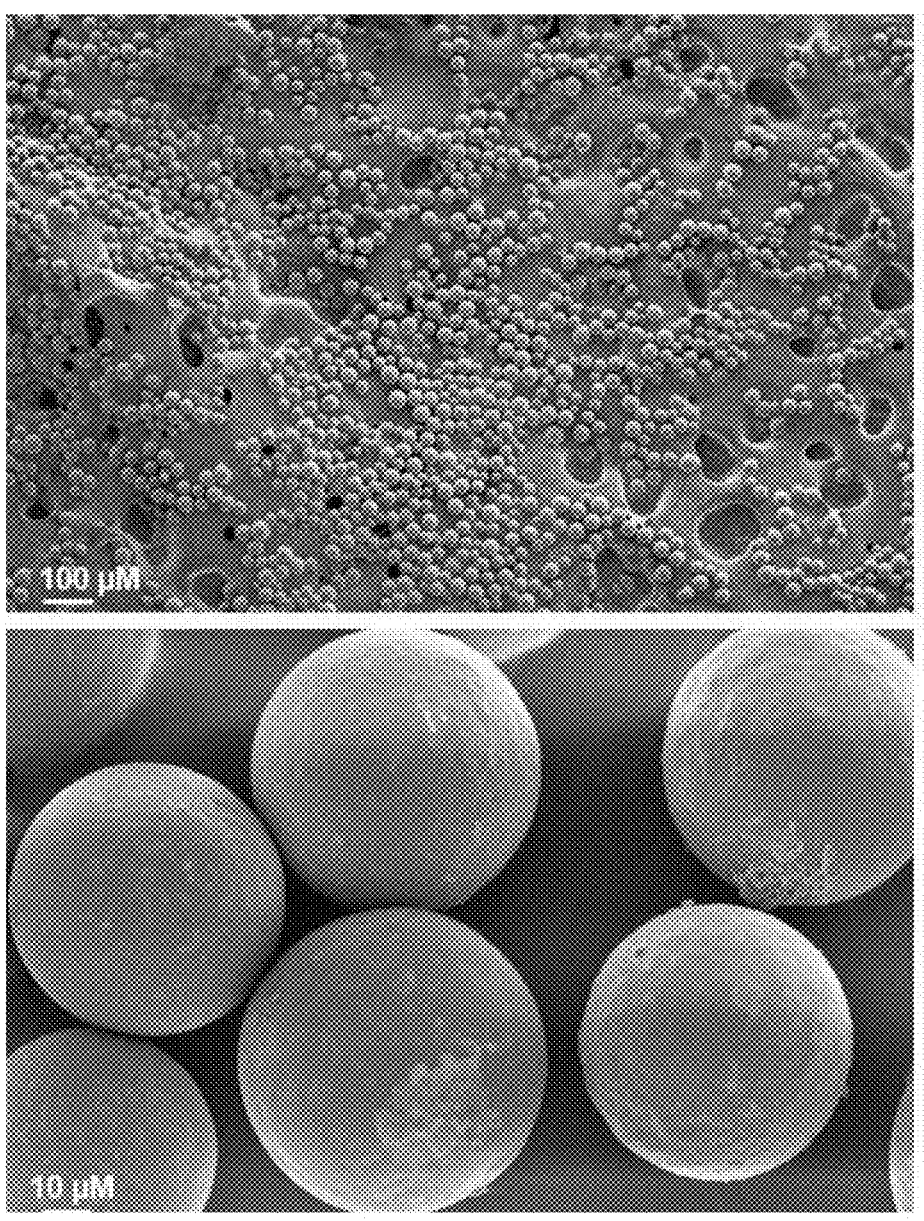
FIG. 6 represents a resolution scanning electron microscopy (SEM) images of the carbon microbeads prepared using micro-graphite and decane diol dimethacrylate in accordance with an embodiment of the present invention.

FIG. 6 represents a resolution scanning electron micros-copy (SEM) images of the carbon microbeads prepared using micro-graphite and decane diol dimethacrylate in accordance with an embodiment of the present invention. The carbon microbeads are shown at a scale of 100 μm and 10 μm to highlight size aspect.

Figure 7:
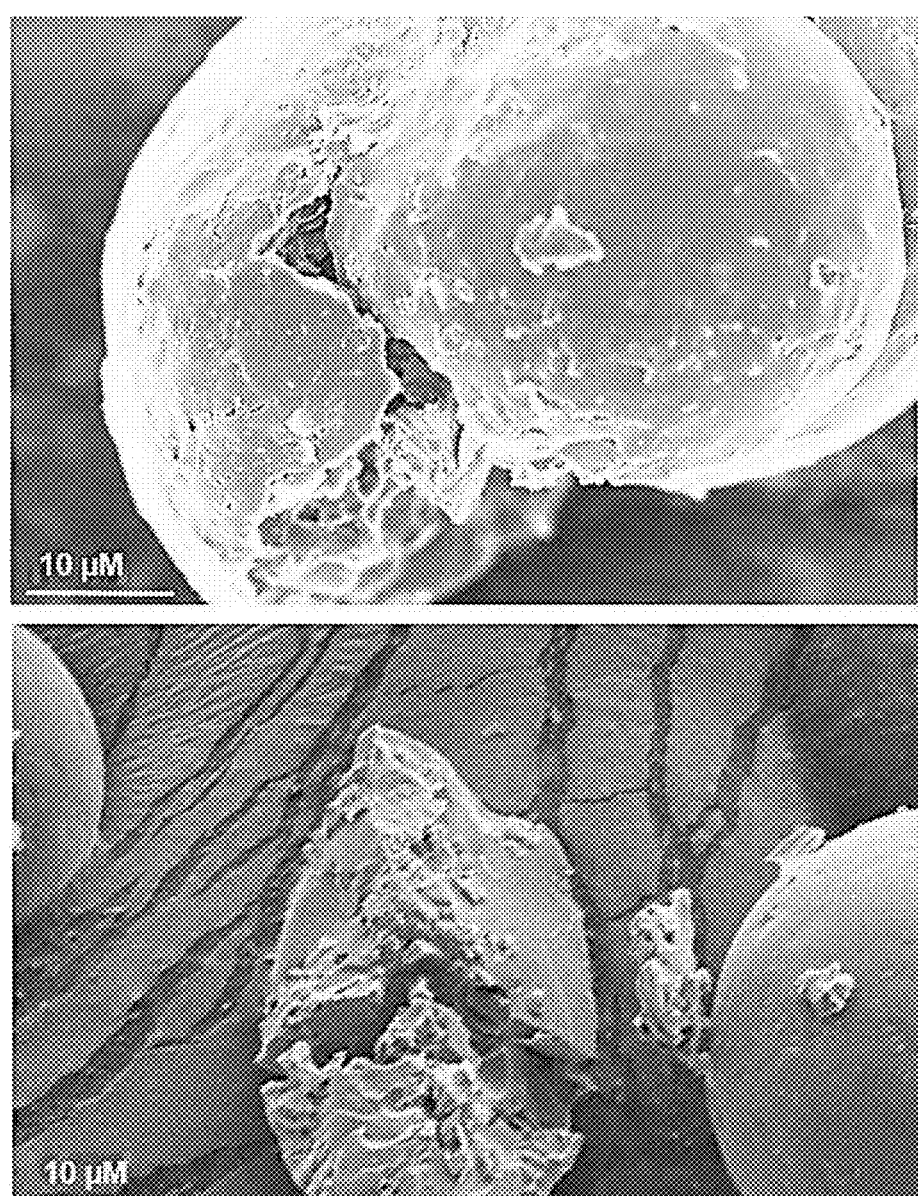
FIG. 7 represents a scanning electron microscopy (SEM) images of the carbon microbeads cracked open in accordance with an embodiment of the present invention.

FIG. 7 represents a scanning electron microscopy (SEM) images of the carbon microbeads cracked open in accor-dance with an embodiment of the present invention.

Figure 8:
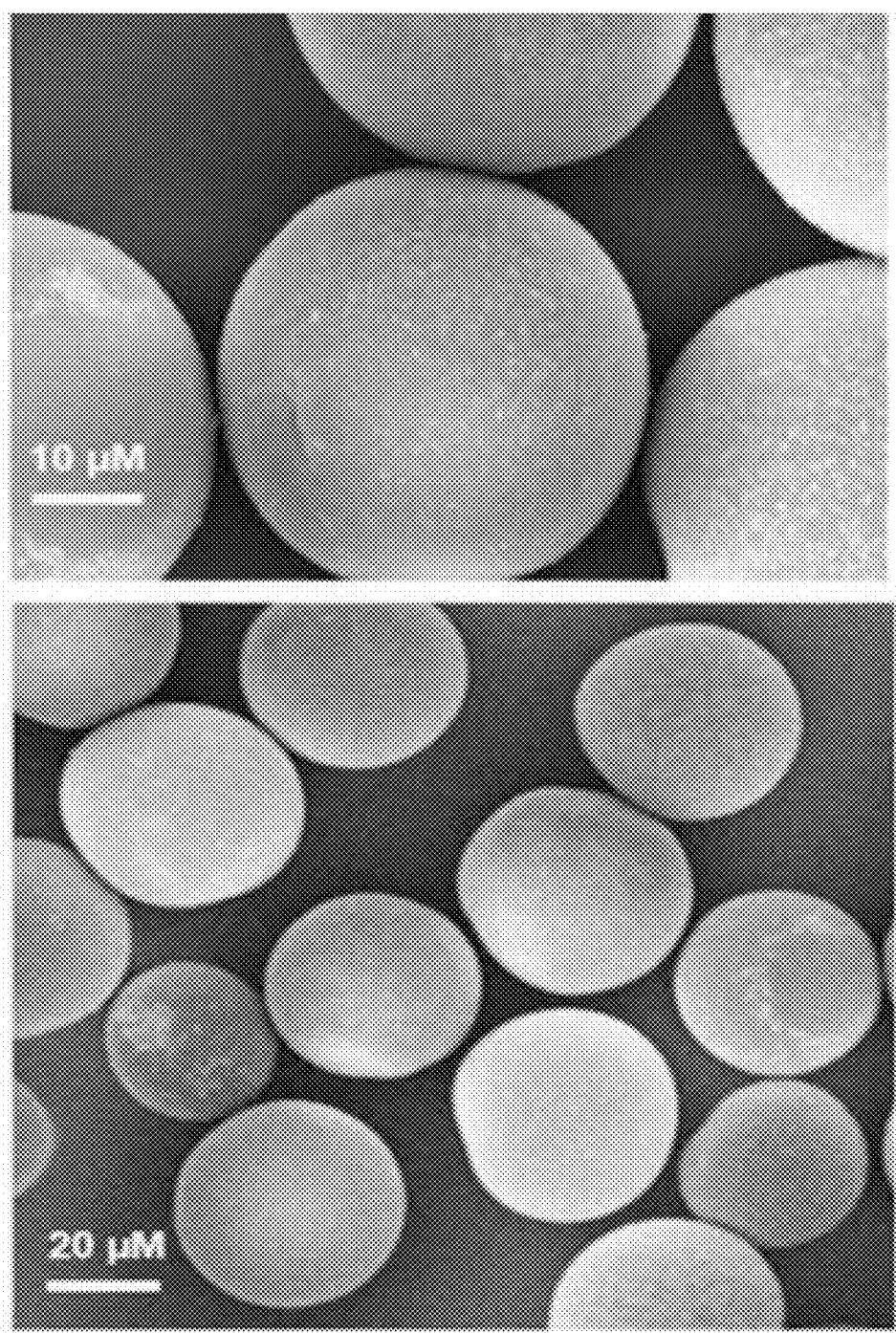
FIG. 8 represents a high (top) and low (bottom) resolution scanning electron microscopy (SEM) images of the carbon microbeads prepared using carbon black in accordance with an embodiment of the present invention.

FIG. 8 represents a high (top) and low (bottom) resolution scanning electron microscopy (SEM) images of the carbon microbeads prepared using carbon black in accordance with an embodiment of the present invention.

Figure 9:
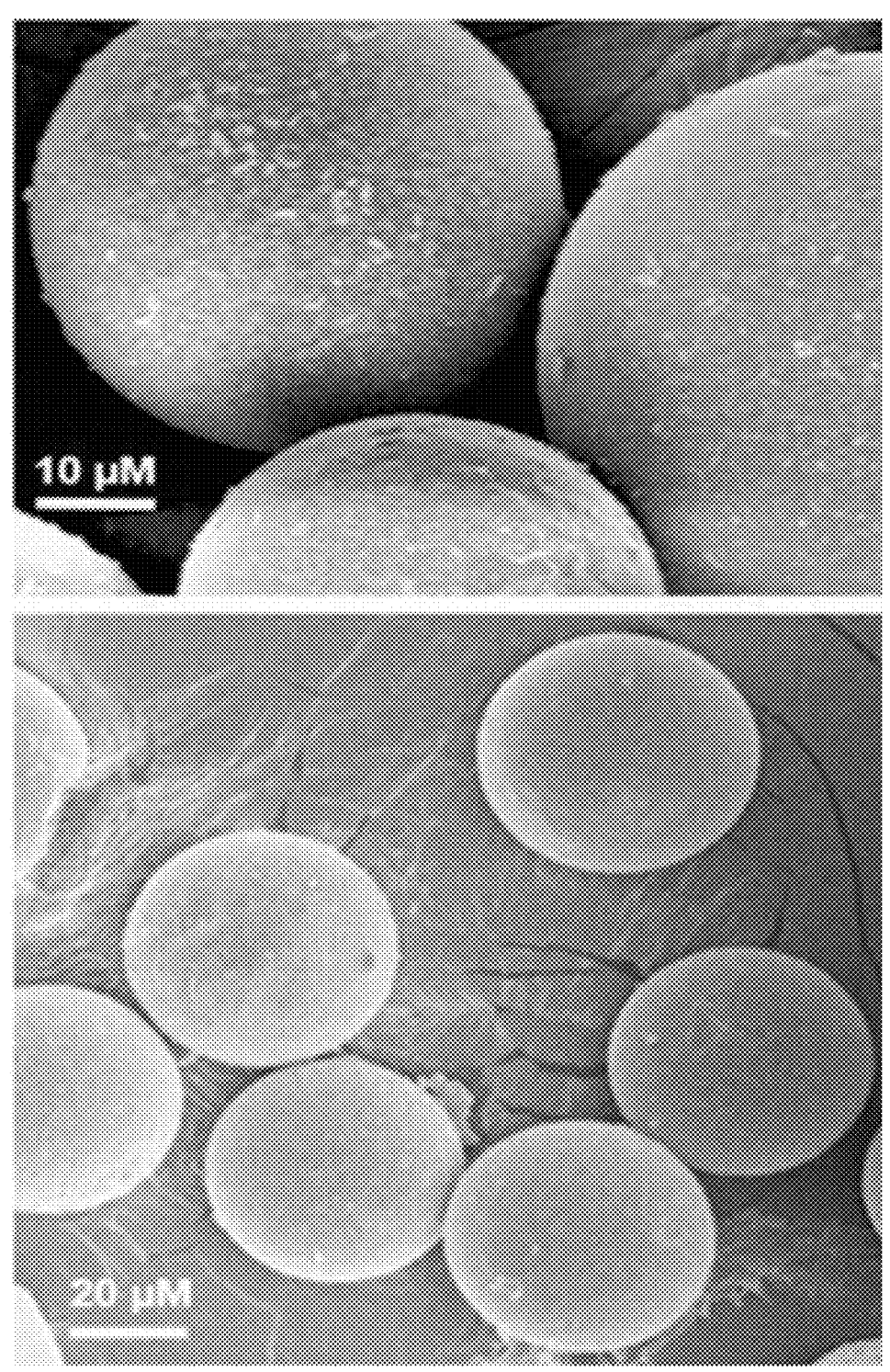
FIG. 9 represents a high (top) and low (bottom) resolution scanning electron microscopy (SEM) images of the carbon microbeads prepared using fullerenes in accordance with an embodiment of the present invention.

FIG. 9 represents a high (top) and low (bottom) resolution scanning electron microscopy (SEM) images of the carbon microbeads prepared using fullerenes in accordance with an embodiment of the present invention.

Figure 10:
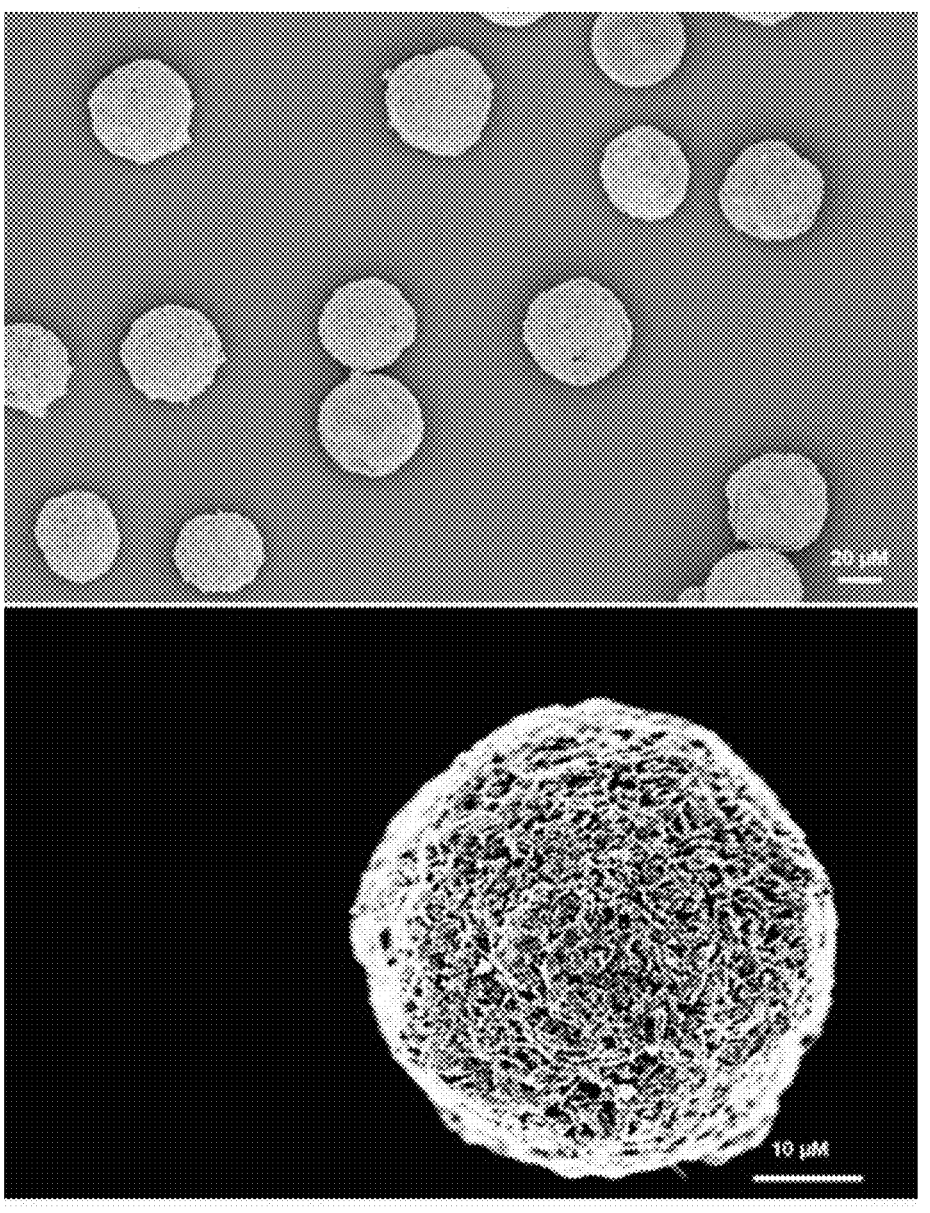
FIG. 10 represents a low (top) and high (bottom) resolution scanning electron microscopy (SEM) images of highly porous carbon microbeads prepared using micro-graphite in accordance with an embodiment of the present invention.

FIG. 10 represents a low (top) and high (bottom) resolu-tion scanning electron microscopy (SEM) images of highly porous carbon microbeads prepared using micro-graphite in accordance with an embodiment of the present invention.

Figure 11A:
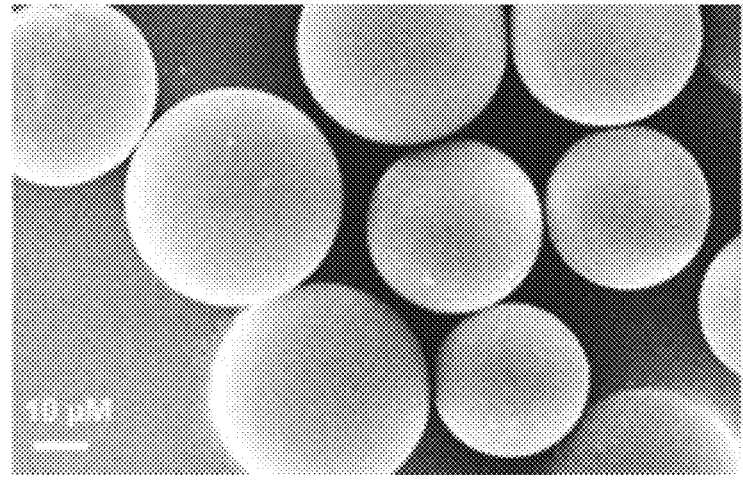
FIGS. 11 (*a*), (*b*) and (*c*) represent a scanning electron microscopy (SEM) images of the carbon microbeads prepared using carbon nanotubes, activated charcoal, graphene oxide, respectively, in accordance with an embodiment of the present invention; and Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present invention so as not to obscure the figures with details that will be readily apparent to those skilled in the art having the benefit of the description herein.
Figure 11B:
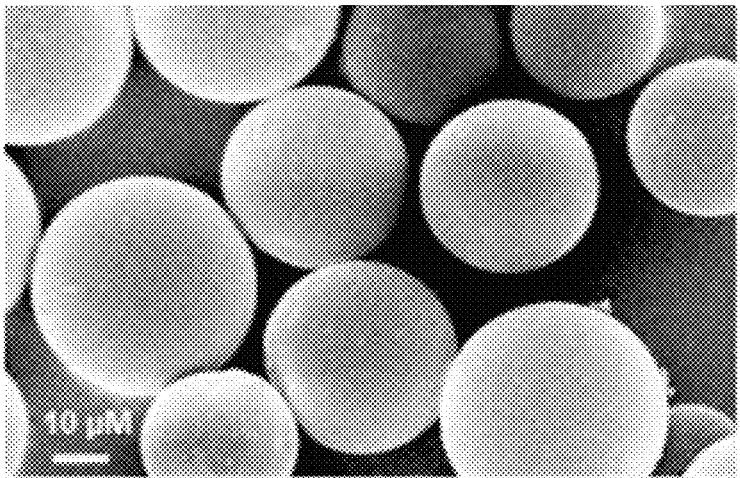
Figure 11C:
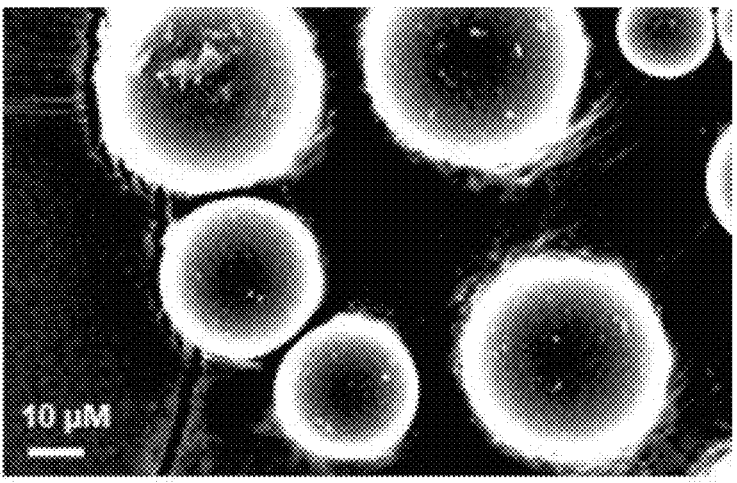

FIGS. 11 (*a*), (*b*) and (*c*) represent a scanning electron microscopy (SEM) images of the carbon microbeads pre-pared using carbon nanotubes, activated charcoal, graphene oxide, respectively, in accordance with an embodiment of the present invention.

Table 1 enlist the properties of the synthesized carbon microbeads.

TABLE 1

Summary of the Pore Diameter, Porosity, And
Mechanical Properties of All-carbon Microbeads.

| Microbead | Median Pore Diameter (nM) | Median Porosity (%) | Young's modulus |
|---|---|---|---|
| Beads synthesized using micro-graphite, carbon nanotubes, graphene, carbon black or fullerenes present at 5-20 weight %. Bead diameters 0.5-200 μm. The pore size and porosity increased by annealing the microbeads. | 0.1-220 | 1-25 | 1 Pa-100 Gpa depending on porosity; decreases with increase in porosity |
| Beads synthesized using micro-graphite, carbon nanotubes, graphene, carbon black or fullerenes present at 5-20 weight % incorporated with porogens (polystyenes (50-1000 nm) or sodium chloride (10-100 μM). Bead diameters 0.5-1000 μm. Porogens are removed by well established leaching methods.[48, 49] | 1000-200,000 | 5-95 | 10 KPa-1 Gpa depending on porosity; decreases with increase in porosity |

TABLE 1-continued

Summary of the Pore Diameter, Porosity, And
Mechanical Properties of All-carbon Microbeads.

| Microbead | Median Pore Diameter (nM) | Median Porosity (%) | Young's modulus |
|---|---|---|---|
| The pore size and porosity can be increased by increasing the amount of porogens. | | | |

EXAMPLES

The present invention is explained further in the following specific examples which are only by way of illustration and are not to be construed as limiting the scope of the invention.

Example 1

2-hydroxy-2-methylpropiophenone was added to 1,10-decanediol dimethacrylate at 2 vol %. This solution was vortex mixed for 30 seconds. Graphite (pulverized <5 um) was added at 5-20 wt % and mixed at 2500 rpm for 2 minutes for obtaining slurry 1 (viscosity 206.5-400 mPa·s). Next, the vial containing this solution was introduced to a 30° C. water bath until thermal equilibrium.

Example 2

2-hydroxy-2-methylpropiophenone was added to 1,4-butanediol dimethacrylate at 2 vol %. This solution was vortex mixed for 30 seconds. Carbon Black (mesoporous <500 nm) was added at 5-20 wt % and mixed at 2500 rpm for 2 minutes to obtain the slurry 2 (viscosity 110-200 mPa·s). Next, the vial containing this solution was introduced to a 30° C. water bath until thermal equilibrium.

Example 3

The preparation of the water-based phase (viscosity 410 mPa·s) included preparation of the water-based outer phase, where the water-based outer phase was paired with slurry 1 or slurry 2 preparations, and used in the microfluidic droplet generator. Xanthan gum was used as part of the continuous phase to increase phase viscosity and stabilize the droplets. An increase in outer phase viscosity enhances the shear forces between the phases as they merge, which develop the deformations in the interfacial boundary causing droplet snap-off. Additionally, the gum stabilizes the droplets from joining back together eliminating the need for surfactants. Xanthan gum/water solution was prepared at 2 g/L concentrations.

Example 4

A process for crosslinking included collection of 400 ml of continuous phase containing droplets for each 1000 ml beaker. The beakers were placed under continuous UV (330 nm) radiation for a duration of 3 hours and left standing for one additional hour. This time scale was selected to achieve close to 100% polymerization of the monomer binder.

Example 5

Separation of photopolymerized droplets achieved by transferring the entire contents of a beaker (continuous phase and photopolymerized droplets) to a 450 ml conical base centrifuge tube and centrifuging at 1200 rpm for 20 minutes. After which the supernatant is vacuumed off. 200 ml of DI water was added to the remaining pellet of cured beads and the entire tube is shaken to break up the pellet for a washing step. Further, the tube is centrifuged using centrifuge for an additional 20 minutes at 1200 RPM, and this wash cycle is repeated thrice.

Example 6

The washed pellet was pipetted to a separate glass beaker, then decanted and heated in an oven at 110° C. for 10 minutes-two hours to dry in order to obtain the dry carbon beads.

The present invention provides the spherical particles of carbon beads of sub-micron size, micron size or milli size. The invention provides modulation of the viscous slurry for synthesis of the spherical particles of carbon beads with improved physico-chemical properties. The process enhances ability of the spherical particles of carbon beads to withstand extreme pH and high temperatures. The process and composition also enable modulating pore size and porosity of the spherical particles of carbon beads. The process and compositions enable to generate spherical droplets of a particular size using high viscous slurries. The combination of materials, additives, processing steps open avenues for synthesis of tailorable and customizable carbon beads may be used for separation, filtration, purification, wires and cables, electrodes, sensor, composite and additive manufacturing, pharmaceutical delivery applications. The invention also provides the microfluidic droplet generator configured to synthesize spherical particles of carbon beads with at least one of sub-micron size, micron size and milli size.

While specific language has been used to describe the invention, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:
1. A process for synthesis of carbon beads, comprising:
preparing a viscous slurry in a non-polar solvent configured to function as a disperse phase,
wherein the viscous slurry is prepared using at least one of a binder, a crosslinker molecule, a radical polymerization initiator, and a carbon material,
wherein each of the binder and the crosslinker molecule comprises a plurality of terminal carbon double bond groups and a spacer group, wherein the spacer group is a compound comprising at least one of hydrophilic chains, amphiphilic chains and any combination thereof;

preparing a viscous gel using one or more hydrocolloids, wherein the viscous gel is configured to function as a continuous phase;

passing the disperse phase and the continuous phase into a microfluidic droplet generator to obtain spherical droplets of a predefined size;

subjecting the spherical droplets to one of a thermal treatment and UV radiation to obtain spherical particles of carbon beads; and drying the spherical particles of carbon beads to obtain the carbon beads of a predefined dimension.

2. The process of claim 1, wherein the carbon material is selected from a group consisting of graphite, graphene, carbon black, activated charcoal, nano-diamond, carbon nanotubes, and fullerenes.

3. The process of claim 1, wherein the radical polymerization initiator comprises at least one of benzoyl peroxide (BP), 2,2-azo-bis-isobutyronitrile (AIBN), 2-Hydroxy-2-methyl-propiophenone, and Diphenyl iodonium nitrate.

4. The process of claim 1, wherein the viscous gel is prepared in a polar media which is immiscible in a non-polar solvent.

5. The process of claim 1, wherein the predefined dimension of the carbon beads comprises at least one of a sub-micron size, micron size and milli-size.

6. The process of claim 1, wherein the predefined size of the spherical droplets comprises a range of 10 mm to 100 nm, preferably 10 μm to 90 μm.

7. The process of claim 1, wherein the one or more hydrocolloids are selected from a group consisting of xanthan gum, gum arabic, polyvinyl alcohol (PVA), polyvinylpyrrolidone (PVP), polyethylene glycol (PEG) or a derivative or combination thereof.

8. The process of claim 1, further comprising adding a first additive to the viscous slurry.

9. The process of claim 8, wherein the first additive is selected from a group consisting of one or more radical accelerators, one or more porogens, and one or more atoms and one or more molecules to modulate an optical property, an electrical property, an acoustic property, a thermal property and a magnetic property of the spherical particles of carbon beads.

10. The process of claim 9, wherein the one or more radical accelerators are selected from a group consisting of methyl ethyl ketone hydroperoxide, t-butyl hydroperoxide, cumylhydroperoxide, p-isopropyl cumyl hydroperoxide, cobalt naphthenate, and cobalt acetylacetonate for improving the mechanical properties.

11. The process of claim 9, wherein the one or more porogens are selected from a group consisting of methanol, ethanol, 1-propanol, 2-propanol, 1-butanol, 1,4-butanediol, cyclohexane, benzene, toluene, and NaCl crystals for modulating pore size and porosity.

12. The process of claim 9, wherein for modulating the optical property of the spherical particles of carbon beads, the one or more atoms and the one or more molecules are selected from a group consisting nano tubes, nano-diamond, silica, aluminium, silver, gold, organic flurophores, lanthanoids or derivatives or combination thereof.

13. The process of claim 9, wherein for modulating the electrical property of the spherical particles of carbon beads, the one or more atoms and the one or more molecules are be selected from a group consisting copper, gold, silver, and aluminium.

14. The process of claim 9, wherein for modulating the acoustic property of the spherical particles of carbon beads, the one or more atoms and the one or more molecules are be selected from a group comprising sulfur hexafluoride and barium.

15. The process of claim 9, wherein modulating one of the thermal and the magnetic property of the spherical particles of carbon beads, the one or more atoms and the one or more molecules are be selected from a group consisting iron, nickel, cobalt and their oxides.

16. The process of claim 1, further comprising adding a second additive to the viscous gel for controlling size of the spherical droplets.

17. The process of claim 16, wherein the second additive is selected from a group consisting of ammonium sulfate and sodium chloride.

18. The process of claim 1, further comprising functionalizing at least one of interior structures and an exterior surface of the carbon beads with at least one of atom, molecule, and macromolecule through one of a covalent and a non-covalent bonding, wherein the interior structures comprise at least one of micro pores, meso pores, and macro pores.

* * * * *